United States Patent
Kamikake

(10) Patent No.: US 10,620,047 B2
(45) Date of Patent: Apr. 14, 2020

(54) INFRARED SPECTROPHOTOMETER AND METHOD OF STORING WINDOW MEMBER

(71) Applicant: SHIMADZU CORPORATION, Kyoto-shi, Kyoto (JP)

(72) Inventor: Tadafusa Kamikake, Kyoto (JP)

(73) Assignee: SHIMADZU CORPORATION, Kyoto-shi, Kyoto (JP)

(*) Notice: Subject to any disclaimer, the term of this patent is extended or adjusted under 35 U.S.C. 154(b) by 0 days.

(21) Appl. No.: 16/182,709

(22) Filed: Nov. 7, 2018

(65) Prior Publication Data

US 2019/0162593 A1  May 30, 2019

(30) Foreign Application Priority Data

Nov. 24, 2017  (JP) .................................. 2017-226054

(51) Int. Cl.
*G01J 3/02* (2006.01)
*G01J 3/453* (2006.01)
(Continued)

(52) U.S. Cl.
CPC ........... *G01J 3/0291* (2013.01); *G01J 3/0202* (2013.01); *G01J 3/0286* (2013.01); *G01J 3/42* (2013.01); *G01J 3/453* (2013.01); *G01J 5/0875* (2013.01)

(58) Field of Classification Search
CPC ...... G01J 3/0202; G01J 3/0286; G01J 3/0291; G01J 3/42; G01J 3/453; G01J 5/0875
See application file for complete search history.

(56) References Cited

U.S. PATENT DOCUMENTS

| 2004/0027462 A1* | 2/2004 | Hing ..................... G01J 3/02 348/222.1 |
| 2010/0317092 A1* | 12/2010 | Suzuki ............... A61B 5/14532 435/287.1 |

(Continued)

FOREIGN PATENT DOCUMENTS

| EP | 2 233 898 A2 | 9/2010 |
| JP | 2010-237168 A | 10/2010 |

OTHER PUBLICATIONS

Anonymous, "FTIR and UV-Vis Accessories, ATR Specular and Diffuse Reflectance, Integrating Spheres, Microscopes and Transmission", PIKE Technologies, 2017 [Internet] <https:web.archive.org/web/20171012194732/http://www.piketech.com/TR-Demountable-Liquid-Cell.html>, retrieved on Apr. 18, 2019, pp. 1-10.

(Continued)

*Primary Examiner* — Marcus H Taningco
(74) *Attorney, Agent, or Firm* — Sughrue Mion, PLLC

(57) ABSTRACT

A housing has a partition wall constituting a wall surface of a sample chamber, and an interferometer chamber accommodating an optical component is formed on an opposite side to the sample chamber with respect to the partition wall. A window member is attachable to and detachable from an opening formed in the partition wall, and transmits light between the sample chamber and the interferometer chamber. The lid member is attachable to and detachable from the window member, and internally has a moisture absorbent accommodating space for accommodating a moisture absorbent. The lid member engages with the window member attached to the opening from a side of the sample chamber, so that the side of the sample chamber of the window member is covered with the lid member, and the moisture absorbent accommodating space is set in a substantially airtight state.

9 Claims, 20 Drawing Sheets

(51) Int. Cl.
*G01J 5/08* (2006.01)
*G01J 3/42* (2006.01)

(56) References Cited

U.S. PATENT DOCUMENTS

2017/0176320 A1* 6/2017 Goede .................... G01N 21/03
2018/0088037 A1* 3/2018 Liu ........................ G01N 21/01

OTHER PUBLICATIONS

PIKE Technologies, "Demountable Liquid Cells—*For Versatile Pathlength Liquid Sampling*", 2018, total 1 page.
Anonymous, "The Micro Compression Cell User Manual", Specac Ltd., Apr. 2016, 2I-02520, Issue 5, pp. 2-16 (total 20 pages).
Communication dated May 3, 2019 from European Patent Office in counterpart EP Application No. 18205613.5.

\* cited by examiner

INFRARED SPECTROPHOTOMETER AND METHOD OF STORING WINDOW MEMBER

CROSS REFERENCE TO RELATED APPLICATION

This application claims priority to Japanese Patent Application No. 2017-226054 filed on Nov. 24, 2017, the entire disclosure of which is incorporated by reference herein.

BACKGROUND OF THE INVENTION

Field of the Invention

The present invention relates to an infrared spectrophotometer which irradiates a sample in a sample chamber with infrared light and detects light from the sample with a detector and a method of storing a window member in the infrared spectrophotometer.

Description of the Related Art

A Fourier transform infrared spectrophotometer (FTIR) which is an example of an infrared spectrophotometer is provided with a sample chamber for placing a sample, and a sample in the sample chamber is irradiated with infrared light. Then, a spectrum can be obtained by detecting transmitted light or reflected light from the sample with a detector and performing calculation based on the detection signal.

The infrared light with which the sample in the sample chamber is irradiated is formed into interference light by using a movable mirror, a fixed mirror, a beam splitter, and the like, and then transmitted through the window member to be applied into the sample chamber. Optical components such as a movable mirror, a fixed mirror, and a beam splitter are disposed in a space (interferometer chamber) formed in the housing. In addition, a partition wall is provided in the housing, and the sample chamber and the interferometer chamber are partitioned by the partition wall.

The window member is attached to an opening formed in the partition wall and transmits the interference light generated in the interferometer chamber to the sample chamber. Conventionally, a window member is generally attached to a device via a screw mechanism. As a material for the window member, potassium bromide (KBr) which is inexpensive and has high infrared light transmittance is often used. This potassium bromide has the property of having high deliquescence and hence being easily deliquesced depending on the humidity of the surrounding environment (see, for example, JP-A-2010-237168).

In order to avoid deliquescence of the window member as described above, for example, the space in which the device is disposed is constantly air-conditioned or the window member is discarded when it is deliquesced. However, such operations lead to increases in the cost of the electricity bill and the cost of the window member. For this reason, when the device is not in use, the window member is detached from the device and stored in a low-humidity environment.

In detaching the window member with high deliquescence like the above potassium bromide, if a user touches the window member with his/her hand, the window member deliquesces with the humidity of the hand. Since the window member is firmly attached to the device, a large force is required for detachment. For this reason, a dedicated tool is generally used for attaching and detaching the window member. In addition, in changing the window member to a window member with a different transmission wavelength, the window member is detached and attached by using the dedicated tool.

When the device is not used, the window member is detached from the device by using the dedicated tool as described above, and a lid member is attached to the opening of the partition wall after the window member is detached. Since the interferometer chamber is kept in a dry and airtight state by attaching the lid member to the opening and providing a moisture absorption mechanism in the interferometer chamber, it is possible to prevent deterioration in optical components (for example, a beam splitter) made of a material with high deliquescence like the window member.

SUMMARY OF THE INVENTION

However, the operation of detaching the window member from the device when it is not in use and reattaching the window member when the device is used is very cumbersome. One of the reasons for this is that the window member attached to the device with a screw mechanism is attached and detached by using the dedicated tool for attaching and detaching the window member. Further, in a configuration in which the window member is attached to and detached from the device with a screw mechanism, the window member may be excessively rotated to be damaged. In addition, a low-humidity environment for storing the window member detached from the device must be prepared. Therefore, there is a problem that the window member cannot be easily stored in a low-humidity environment.

The present invention has been made in view of the above circumstances, and an object of the present invention is to provide an infrared spectrophotometer that can easily store a window member in a low-humidity environment and a method of storing the window member. Another object of the present invention is to provide an infrared spectrophotometer that can easily store a window member, and attach and detach the window member.

(1) An infrared spectrophotometer according to the present invention is an infrared spectrophotometer that irradiates a sample in a sample chamber with infrared light and detects light from the sample with a detector. The infrared spectrophotometer includes a housing, a window member, and a lid member. The housing has a partition wall constituting a wall surface of the sample chamber, and an interferometer chamber in which an optical component is disposed is formed on an opposite side to the sample chamber with respect to the partition wall. The window member is attachable to and detachable from an opening formed in the partition wall, and transmits light between the sample chamber and the interferometer chamber. The lid member is attachable to and detachable from the window member, and has a space formed internally. The lid member engages with the window member attached to the opening from a side of the sample chamber so that the side of the sample chamber of the window member is covered with the lid member to set the space in a substantially airtight state.

According to such a configuration, engaging the lid member with the window member attached to the opening from the side of the sample chamber can cover the side of the sample chamber of the window member with the lid member. In this state, since the space formed inside the lid member is set in a substantially airtight state, accommodating a moisture absorbent in the space can prevent the window member from deteriorating due to the humidity of the surrounding environment. Therefore, the window member can be easily stored in a low-humidity environment without being detached.

(2) While the window member is attached to the lid member, the window member may be fixed to the opening by using the lid member, and the lid member may be detached from the window member after the window member is fixed.

According to such a configuration, the window member can be fixed to the opening by using the lid member. That is, while the window member can be covered with the lid member when being stored, the window member can be attached and detached by using the lid member. Therefore, it is easy to store the window member, and attach and detach the window member. Further, there is no need to separately prepare a dedicated tool for attaching and detaching the window member.

(3) An engagement state of the lid member with respect to the window member may be released by inserting the window member attached to the lid member into the opening and rotating the lid member in one direction to a first rotational position. In this case, the window member may be fixed to the opening by further rotating the lid member from the first rotational position in the one direction to a second rotational position.

According to such a configuration, the window member can be fixed to the opening only by inserting the window member into the opening and rotating the lid member in the one direction while the window member is attached to the lid member, and the lid member can be detached from the window member. This further facilitates attaching and detaching the window member.

(4) The lid member may engage with the window member to set the space in a substantially airtight state by rotating the lid member from the second rotational position in a direction opposite to the one direction while the window member is fixed to the opening.

According to such a configuration, only by rotating the lid member in the direction opposite to the one direction while the window member is fixed to the opening, the space formed inside the lid member can easily be set in a substantially airtight state. This further facilitates storing the window member.

(5) The window member may be detached from the opening by further rotating the lid member in the direction opposite to the one direction from a state in which the lid member engages with the window member.

According to such a configuration, the window member can be easily detached from the opening only by rotating the lid member in the direction opposite to the one direction from a state in which the window member is covered with the lid member and stored. This further facilitates attaching and detaching the window member.

(6) The window member may have a protrusion protruding toward an opposite side to the lid member while the window member is attached to the lid member. The partition wall may have a positioning hole for positioning the window member by allowing the protrusion to be inserted. In this case, the protrusion may engage with the positioning hole to fix the window member to the opening by inserting the window member attached to the lid member into the opening and rotating the lid member to the second rotational position.

According to such a configuration, the protrusion engages with the positioning hole and can be easily fixed to the opening only by inserting the protrusion formed on the window member into the positioning hole of the partition wall and rotating the lid member. As described above, when the protrusion is configured to engage with the positioning hole, the window member can always be fixed at the same position without excessively rotating the lid member unlike the case of using the screw mechanism, thereby preventing the window member from being damaged.

(7) The lid member may have a closing portion on an opposite side to a side on which the window member is attached. In this case, the opening may be closed by inserting the closing portion into the opening.

According to such a configuration, when the window member is not attached to the opening, for example, during transportation or storage, the lid member is turned to the other side and the closing portion is inserted into the opening, thereby closing the opening. This can make the interferometer chamber in the housing into an enclosed space, and hence can prevent deterioration of the disposed optical component due to humidity.

(8) A method of storing a window member according to the present invention is a method of storing a window member of an infrared spectrophotometer including a housing having a partition wall constituting a wall surface of a sample chamber, with an interferometer chamber in which an optical component is disposed being formed on an opposite side to the sample chamber with respect to the partition wall, and the window member that is attachable to and detachable from an opening formed in the partition wall and transmits light between the sample chamber and the interferometer chamber. This method includes a moisture absorbent accommodating step and a lid member engaging step. In the moisture absorbent accommodating step, a moisture absorbent is accommodated in a space formed inside a lid member attachable to and detachable from the window member. In the lid member engaging step, a side of the sample chamber of the window member is covered with the lid member by engaging the lid member with the window member attached to the opening from the side of the sample chamber.

According to the present invention, it is possible to prevent a window member from deteriorating due to the humidity of the surrounding environment by accommodating a moisture absorbent in a space formed inside a lid member, and hence to easily store the window member in a low-humidity environment without detaching the window member.

DETAILED DESCRIPTION OF THE PREFERRED EMBODIMENTS

1. Overall Configuration of Infrared Spectrophotometer

Figure 1:
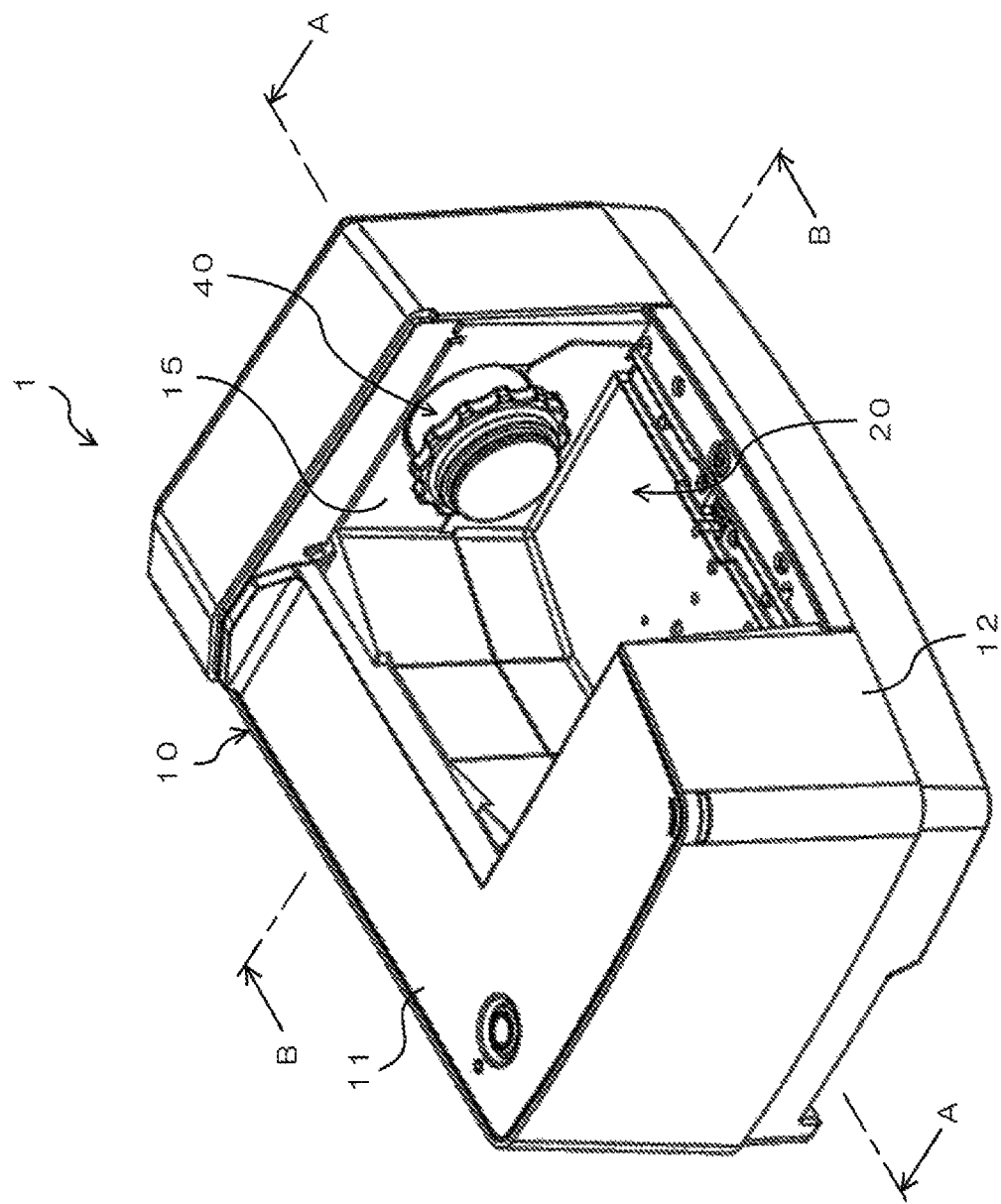
FIG. 1 is a perspective view showing the overall configuration of an infrared spectrophotometer according to an embodiment of the present invention.
Figure 2:
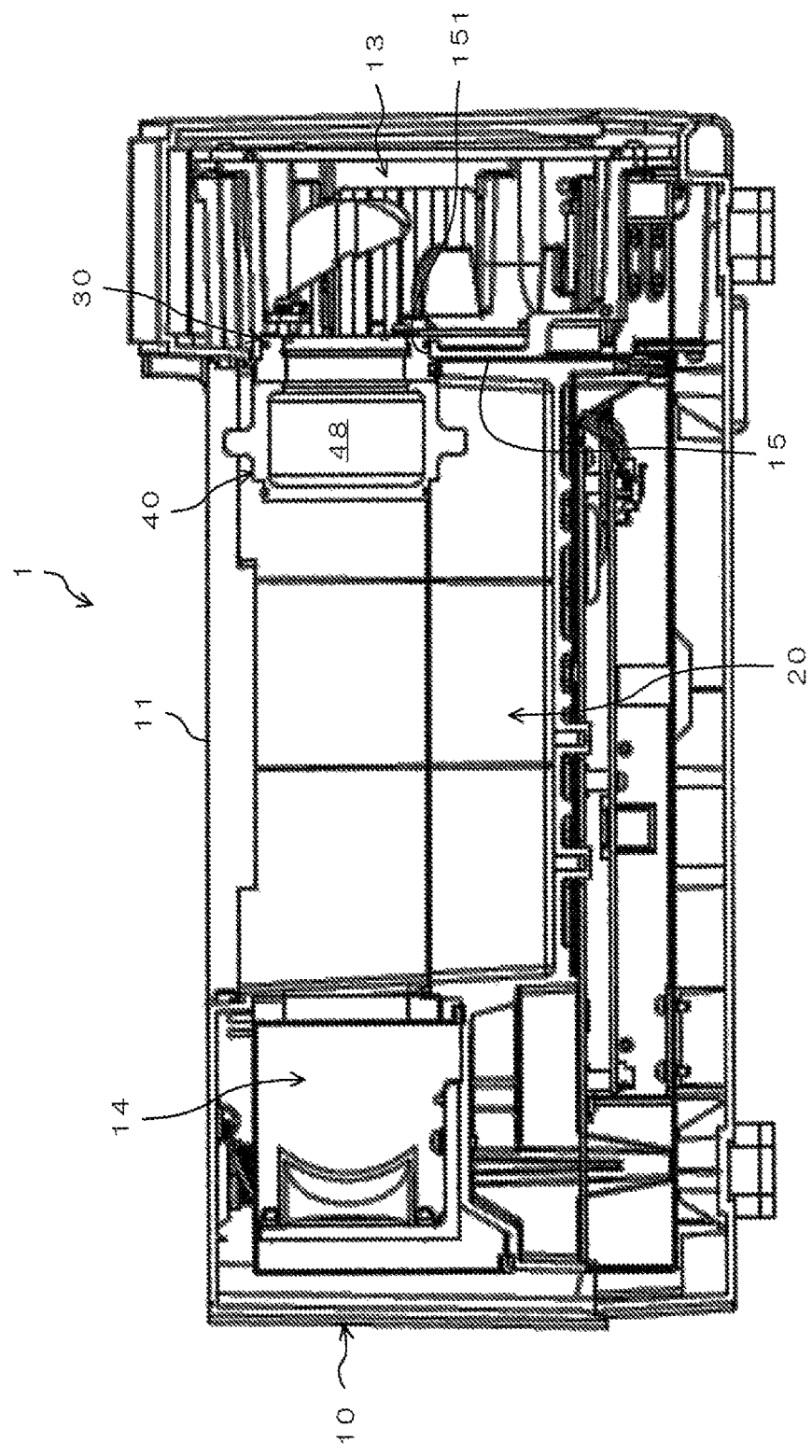
FIG. 2 is a sectional view taken along line A-A of the infrared spectrophotometer in FIG. 1.

FIG. 1 is a perspective view showing the overall configuration of an infrared spectrophotometer 1 according to an embodiment of the present invention. FIG. 2 is a sectional view taken along line A-A of the infrared spectrophotometer 1 in FIG. 1. The infrared spectrophotometer 1 is, for example, a Fourier transform infrared spectrophotometer (FTIR), and its outer shape is partitioned by a rectangular parallelepiped housing 10. A concave portion is formed in a portion of a wall surface of the housing 10, and a space in the concave portion constitutes a sample chamber 20. The sample chamber 20 can be opened and closed by a cover (not shown).

A user can perform work on the housing 10 from the front. The cover is provided over an upper surface 11 and a front surface 12 of the housing 10. Opening the cover will open the upper and the front of the sample chamber 20. By opening the sample chamber 20 in this way, a sample can be loaded in and unloaded from the sample chamber 20. In this infrared spectrophotometer 1, the sample in the sample chamber 20 can be irradiated with infrared light and the light from the sample is detected by a detector (not shown), thereby analyzing the sample.

The housing 10 is a hollow member, and interferometer chambers 13 and 14 for accommodating various optical components are formed on both right and left sides of the sample chamber 20. The interferometer chamber 13 is provided with optical components constituting a Michelson interferometer including a light source, a movable mirror, a fixed mirror, and a beam splitter (none of them are shown). Infrared light emitted from the light source is formed into interference light by using the movable mirror, the fixed mirror, the beam splitter, and the like, and then transmitted through a window member 30 (see FIG. 2) to be applied into the sample chamber 20. The interferometer chamber 14 is provided with optical components such as the detector described above. A laser light source as a reference light source is provided in the housing 10. In order to comply with laser safety standards, an interlock is required to be provided at an opening where a human body may be exposed to laser light.

In the state shown in FIGS. 1 and 2, the window member 30 is covered with a lid member 40 from a side of the sample chamber 20. This state is a state when the infrared spectrophotometer 1 is stored, and the lid member 40 is detached when the infrared spectrophotometer 1 is to be used. As shown in FIG. 2, the lid member 40 is attachable to and detachable from the window member 30. The lid member 40 is formed of, for example, a metal. However, the configuration is not limited to this. The lid member 40 may be formed of a material other than a metal.

The housing 10 has a partition wall 15 constituting the wall surface of the sample chamber 20. The sample chamber 20 is partitioned by the partition wall 15 with respect to the interferometer chambers 13 and 14. That is, the interferometer chambers 13 and 14 are formed on the opposite side to the sample chamber 20 with respect to the partition wall 15.

The window member 30 is attachable to and detachable from an opening 151 formed in the partition wall 15, and light can be transmitted between the sample chamber 20 and the interferometer chamber 13 while the window member 30 is attached to the opening 151. In this embodiment, the interference light generated in the interferometer chamber 13 is transmitted through the window member 30 and is applied on the sample in the sample chamber 20.

Figure 3:
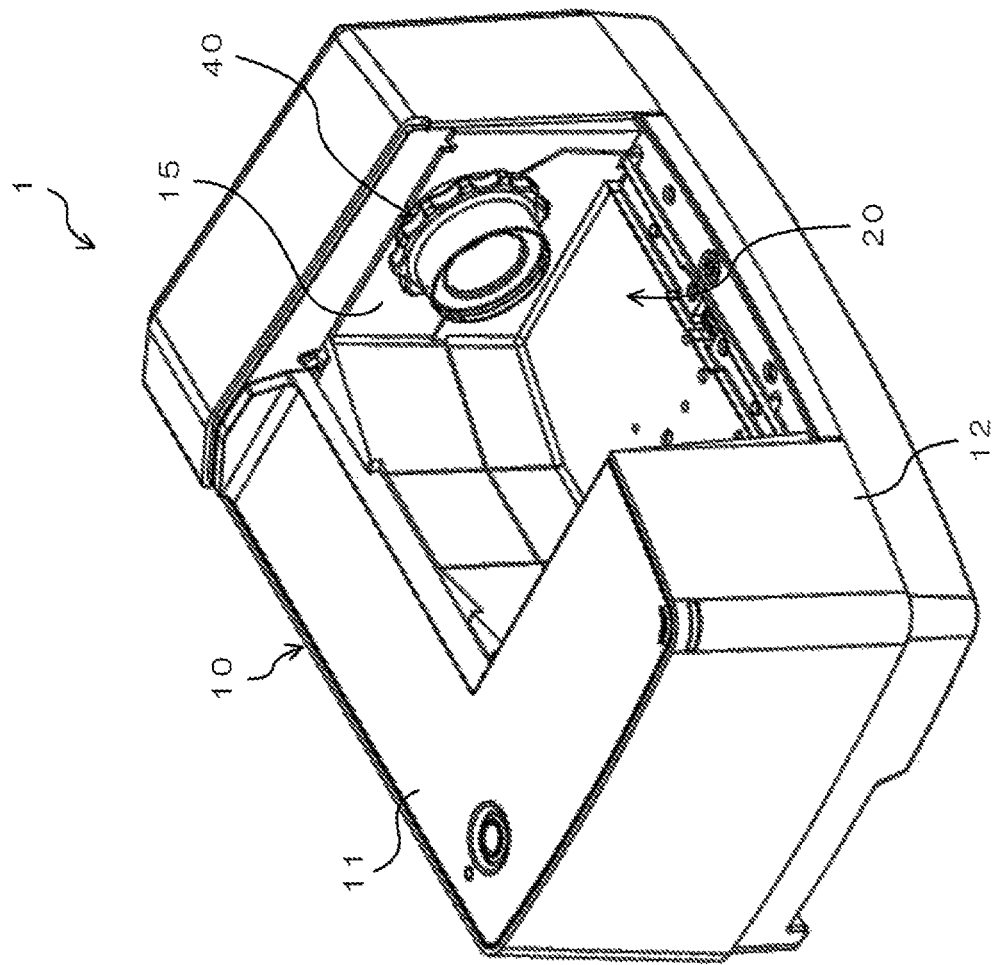
FIG. 3 is a perspective view showing the overall configuration of the infrared spectrophotometer and its state at the time of shipment.

FIG. 3 is a perspective view showing the overall configuration of the infrared spectrophotometer 1 and its state at the time of shipment. In FIG. 3 as well, an illustration of a cover (not shown) for opening and closing the sample chamber 20 is omitted.

As shown in FIG. 3, when the infrared spectrophotometer 1 is shipped out, the lid member 40 is attached to the opening 151 of the partition wall 15 in a manner different from that in FIG. 1. Specifically, as the lid member 40 is turned to the other side, the end portion of the lid member 40 on the opposite side to the side where the window member 30 is attached is inserted into the opening 151. At this time, the window member 30 is not attached to the opening 151, and the infrared spectrophotometer 1 can be shipped out and transported with the opening 151 closed by the lid member 40.

Figure 4:
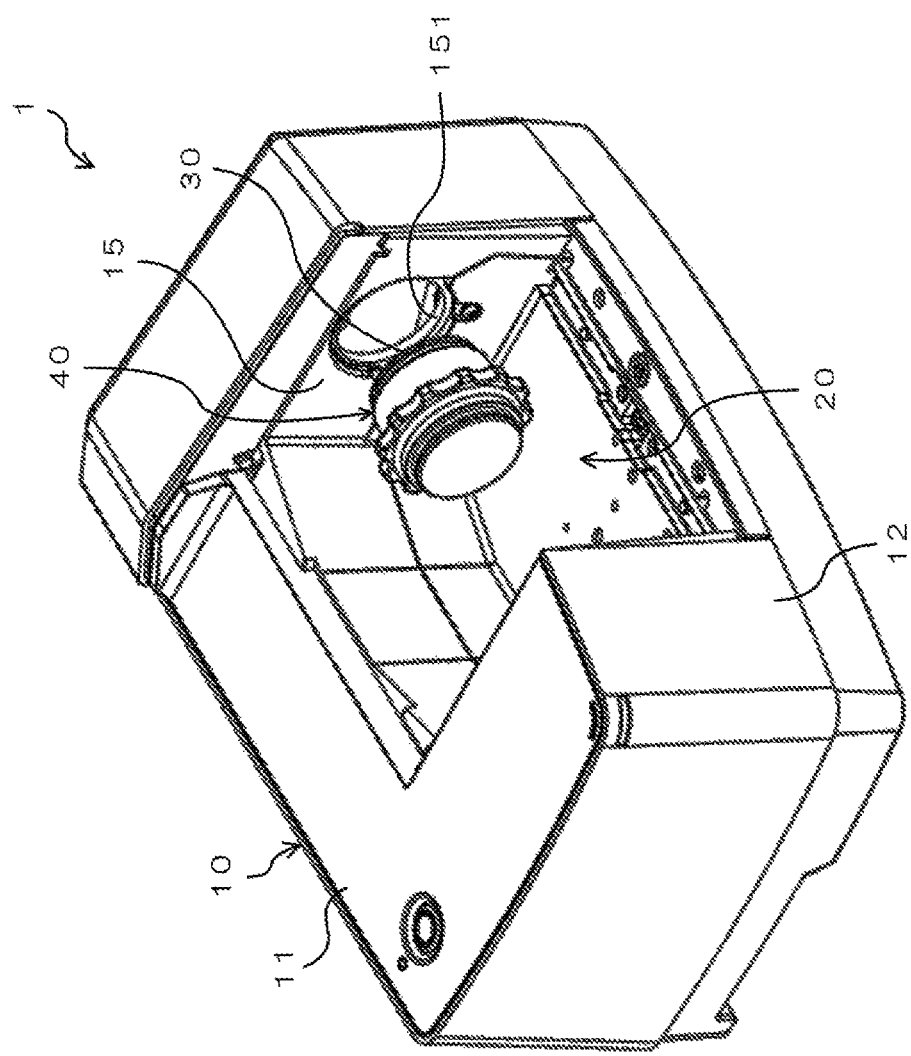
FIG. 4 is a perspective view showing the overall configuration of the infrared spectrophotometer and its state immediately before the attachment of a window member to an opening.
Figure 5:
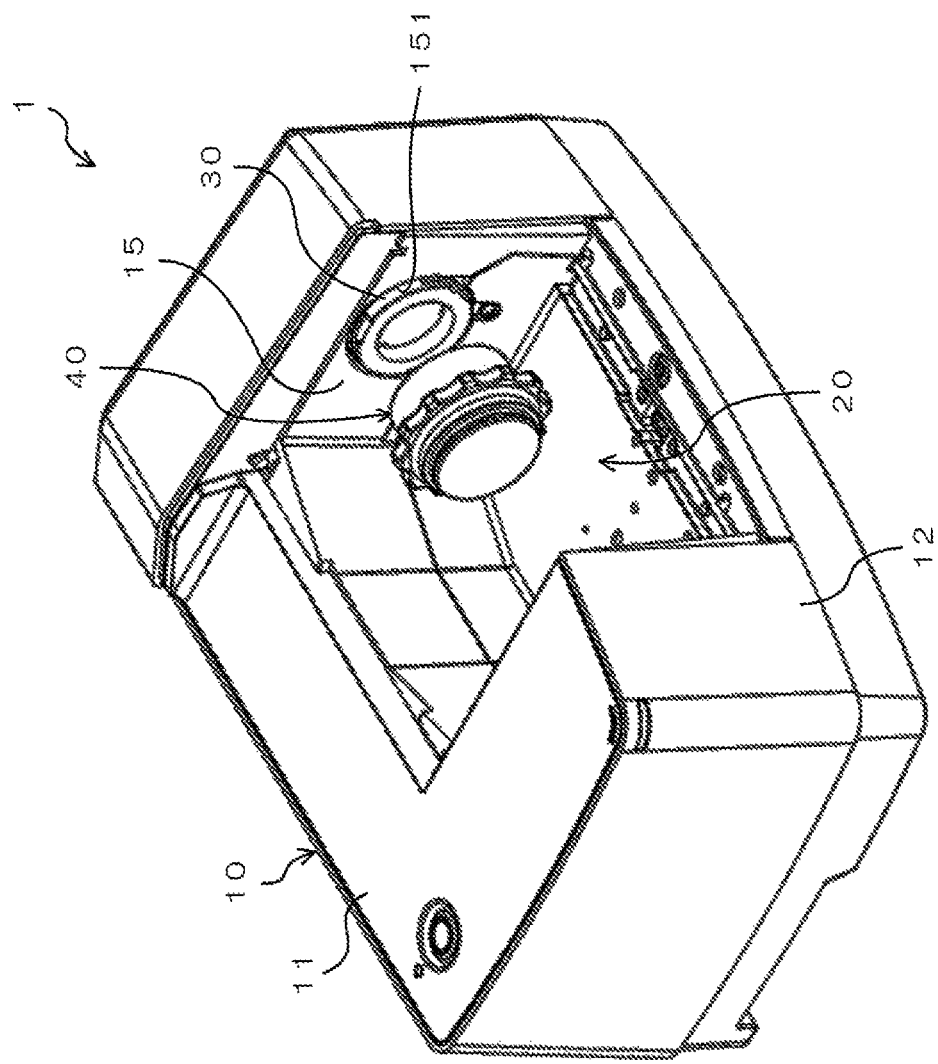
FIG. 5 is a perspective view showing the overall configuration of the infrared spectrophotometer and a state in which the window member is attached to the opening.

FIG. 4 is a perspective view showing the overall configuration of the infrared spectrophotometer 1 and its state immediately before the attachment of the window member 30 to the opening 151. FIG. 5 is a perspective view showing the overall configuration of the infrared spectrophotometer 1 and a state in which the window member 30 is attached to the opening 151. In FIGS. 4 and 5 as well, an illustration of a cover (not shown) for opening and closing the sample chamber 20 is omitted.

When the infrared spectrophotometer 1 is used, the lid member 40 in the state shown in FIG. 3 is detached, and the window member 30 is attached to the lid member 40. Then, as shown in FIG. 4, the window member 30 attached to the lid member 40 is inserted toward the opening 151 of the partition wall 15. Thereafter, by rotating the lid member 40, the window member 30 is rotated and fixed to the opening 151, and after the fixing, the lid member 40 is detached from the window member 30.

As a result, as shown in FIG. 5, the window member 30 is fixed to the opening 151, and light can be transmitted between the sample chamber 20 and the interferometer chamber 13. As described above, in this embodiment, while the window member 30 is attached to the lid member 40, the window member 30 is fixed to the opening 151 by using the lid member 40, and the lid member 40 is then detached from the window member 30.

Figure 6:
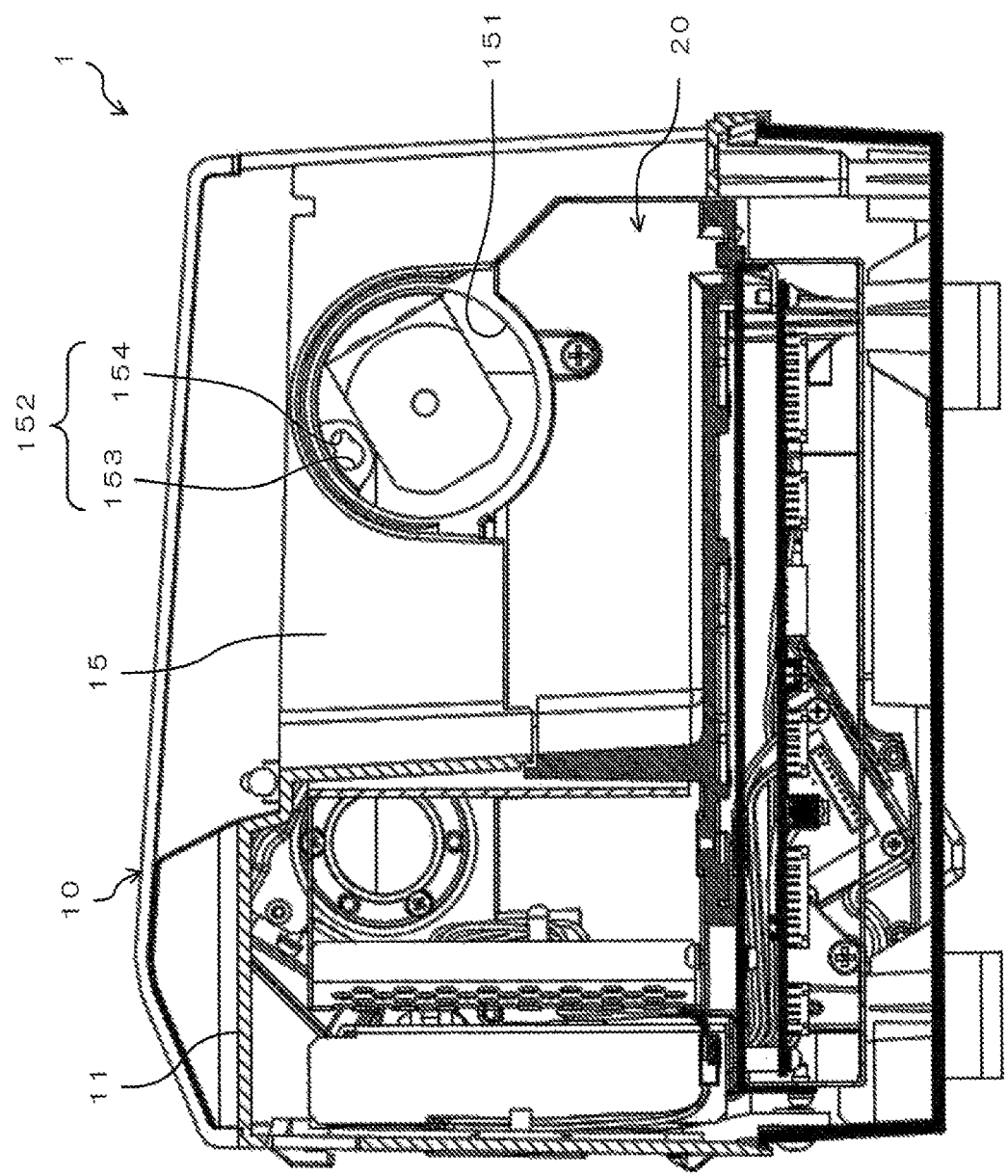
FIG. 6 is a sectional view taken along B-B of the infrared spectrophotometer in FIG. 1, showing a state in which the window member is not attached to the opening.

FIG. 6 is a sectional view taken along B-B of the infrared spectrophotometer 1 in FIG. 1, showing a state in which the window member 30 is not attached to the opening 151. As shown in FIG. 6, a positioning hole 152 for positioning and fixing the window member 30 is formed in the peripheral edge portion of the opening 151 in the partition wall 15. When the window member 30 is attached to the opening 151, a positioning protrusion (not shown) provided on the window member 30 is inserted into the positioning hole 152, and as the window member 30 rotates, the protrusion engages with the positioning hole 152. As a result, the window member 30 is positioned and fixed in the opening 151.

Specifically, the positioning hole 152 has a shape obtained by joining a large-diameter first hole 153 and a small-diameter second hole 154 each having a circular hole. The first hole 153 and the second hole 154 are formed so as to be aligned in the circumferential direction of the circular opening 151. When the window member 30 is attached to the opening 151, the protrusion provided on the window member 30 is inserted into the first hole 153, and the window member 30 is then rotated clockwise in FIG. 6 to move the protrusion from the first hole 153 to the second hole 154, and engages with the second hole 154.

2. Specific Configuration of Lid Member

Figure 7A:
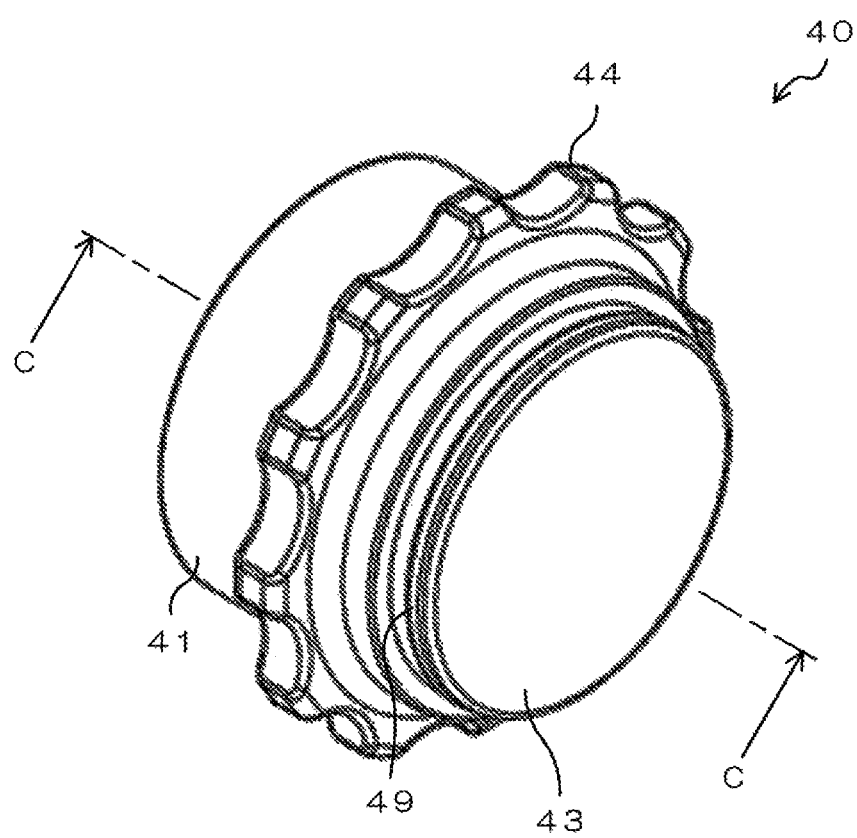
FIG. 7A is a perspective view showing a specific configuration of a lid member.
Figure 7B:
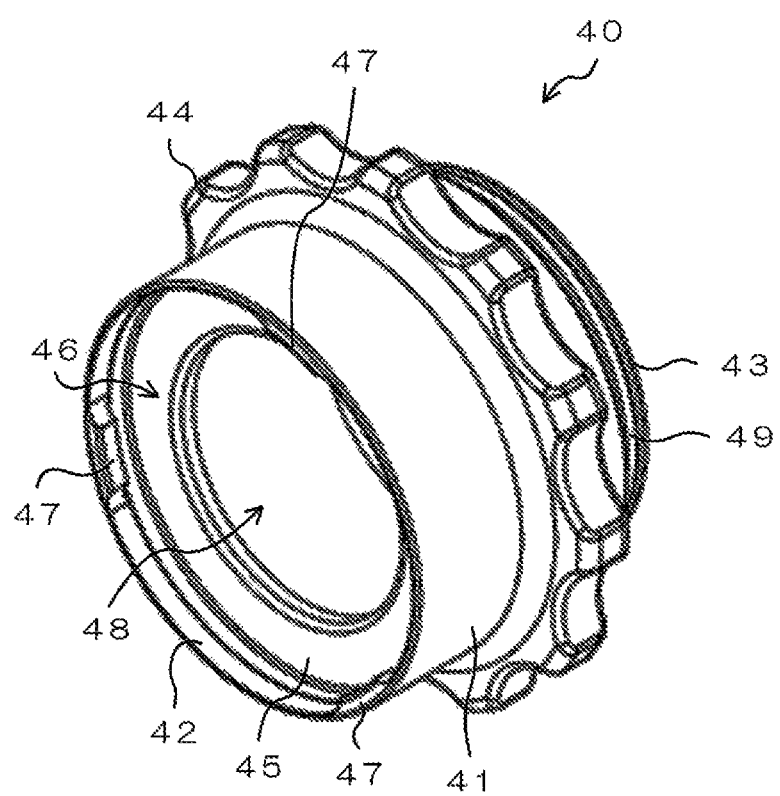
FIG. 7B is a perspective view of the lid member viewed from a direction different from that in FIG. 7A.
Figure 7C:
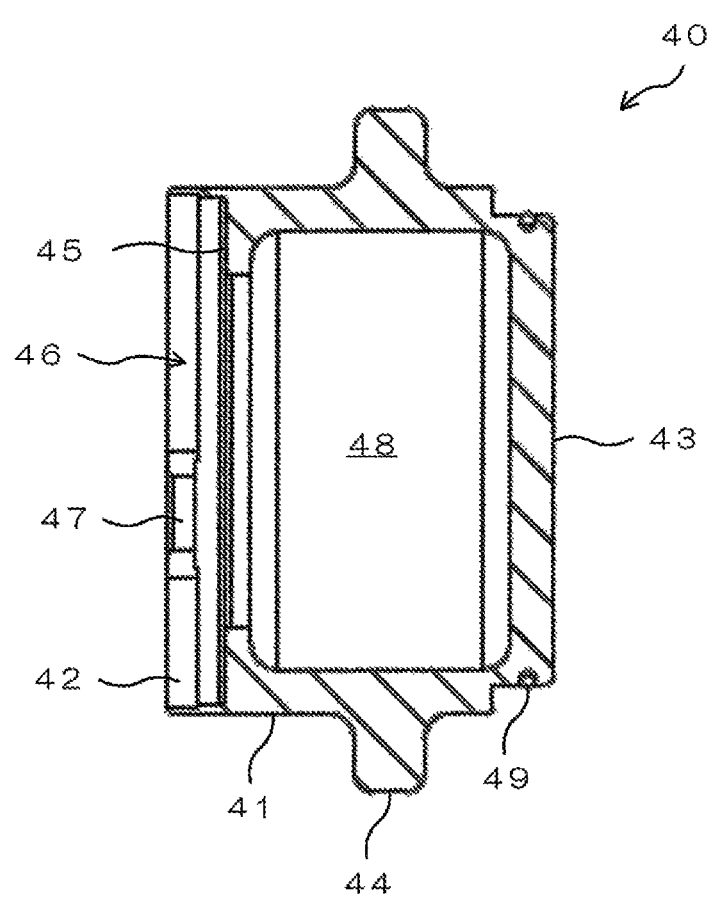
FIG. 7C is a sectional view taken along line C-C of the lid member of FIG. 7A.

FIG. 7A is a perspective view showing a specific configuration of the lid member 40. FIG. 7B is a perspective view of the lid member 40 viewed from a direction different from that in FIG. 7A. FIG. 7C is a sectional view taken along line C-C of the lid member 40 in FIG. 7A.

The lid member 40 has a cylindrical main body 41. One end face of the main body 41 is opened by forming a circular opening 42. The other end face of the main body 41 is closed by a closing portion 43. An annular grip portion 44 is formed on the outer circumferential surface of the main body 41 so as to protrude radially outward. When rotating the lid member 40, the user can grip the grip portion 44 and easily rotate the lid member 40.

An annular flange portion 45 is formed on the inner circumferential surface of the main body 41 so as to protrude radially inward. A space in the main body 41 which is closer to the opening 42 than the flange portion 45 constitutes a window member accommodating space 46 for accommodating the window member 30. That is, the window member 30 is inserted into the main body 41 of the lid member 40 from the opening 42, and is brought into contact with the flange portion 45 by being accommodated in the window member accommodating space 46.

A plurality of engaging protruding portions 47 are formed on the inner circumferential surface of the main body 41 in the window member accommodating space 46. Each of the engaging protruding portions 47 extends in the circumferential direction along the inner circumferential surface of the main body 41. For example, the engaging protruding portions 47 are formed at equal intervals in the circumferential direction. By engaging these engaging protruding portions 47 with the window member 30, the window member 30 is held while being accommodated in the window member accommodating space 46.

A space in the main body 41 which is closer to the closing portion 43 than the flange portion 45 constitutes a moisture absorbent accommodating space 48 for accommodating a moisture absorbent such as silica gel. As will be described later, when the infrared spectrophotometer 1 is not used, a moisture absorbent is accommodated in the moisture absorbent accommodating space 48 of the lid member 40, and the window member 30 is covered with the lid member 40, thereby storing the window member 30 in a low-humidity environment.

A seal member 49 constituted by, for example, an O-ring is attached to the outer circumferential surface of the closing portion 43. At the time of shipment as shown in FIG. 3, the lid member 40 from which the window member 30 is detached is inserted into the opening 151 from the closing portion 43 side to close the opening 151 with the closing portion 43. At this time, the seal member 49 provided on the outer circumferential surface of the closing portion 43 comes into tight contact with the peripheral edge portion of the opening 151, thereby setting the inside of the housing 10 (the interferometer chamber 13) in an airtight state.

3. Specific Configuration of Window Member

Figure 8A:
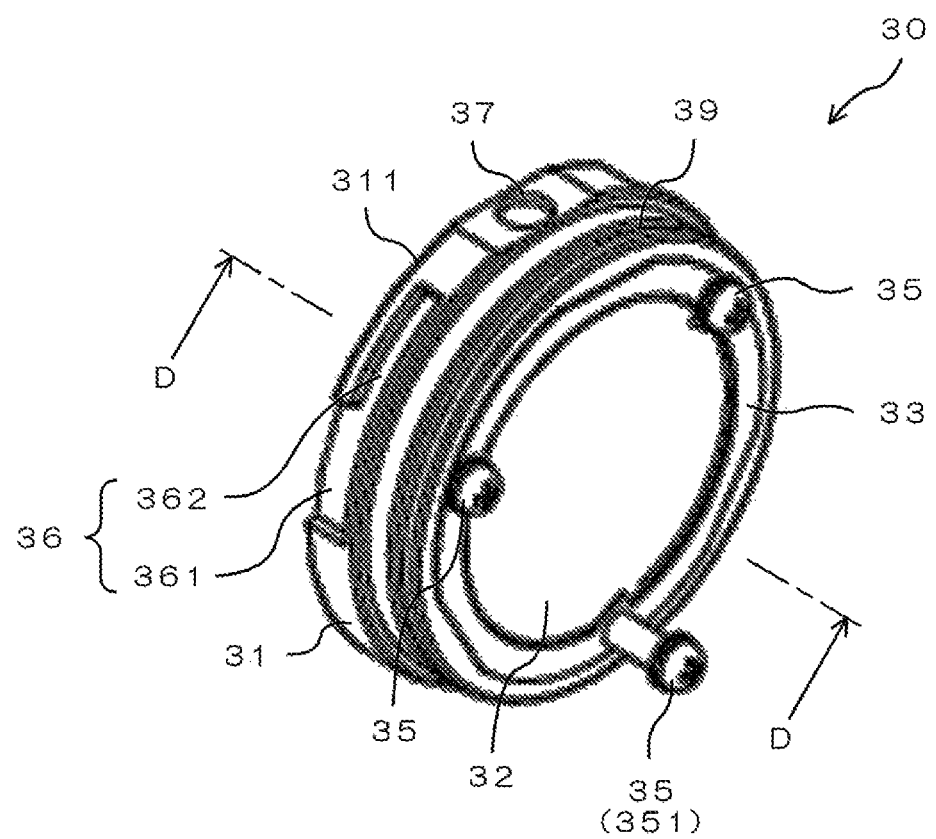
FIG. 8A is a perspective view showing a specific configuration of the window member.
Figure 8B:
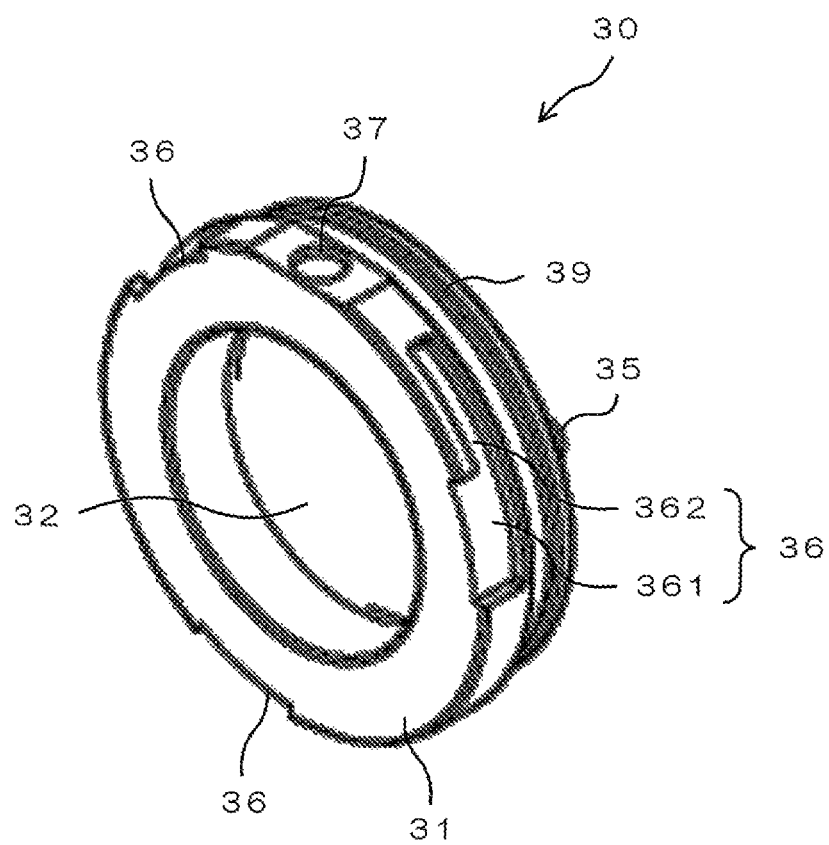
FIG. 8B is a perspective view of the window member viewed from a direction different from that in FIG. 8A.
Figure 8C:
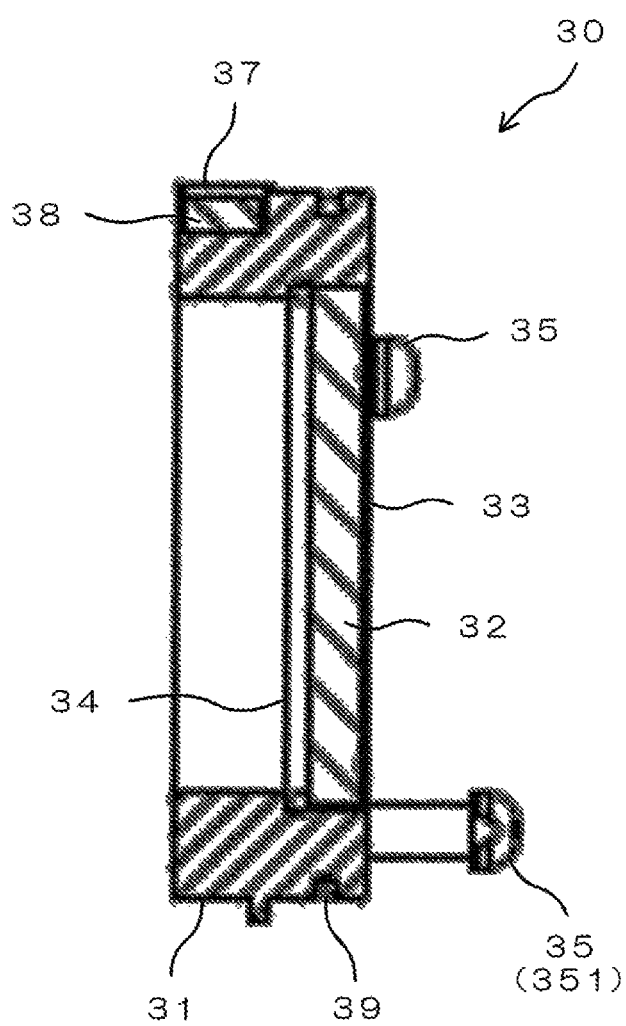
FIG. 8C is a sectional view taken along line D-D of the window member of FIG. 8A.

FIG. 8A is a perspective view showing a specific configuration of the window member 30. FIG. 8B is a perspective view of the window member 30 viewed from a direction different from that in FIG. 8A. FIG. 8C is a sectional view taken along line D-D of the window member 30 of FIG. 8A.

The window member 30 has an annular main body 31, a circular light transmitting plate 32 provided in the main body 31, and a fixing plate 33 for fixing the light transmitting plate 32 to the main body 31. An annular stepped portion is formed on the inner circumferential surface of the main body 31, and the light transmitting plate 32 is in contact with a seal member 34 such as an O-ring provided on the stepped portion. The annular fixing plate 33 is then attached to the main body 31 from the outside, and the light transmitting plate 32 is pressed against the seal member 34 side by the fixing plate 33, thereby air-tightly closing one end face of the main body 31 with the light transmitting plate 32.

The fixing plate 33 is fixed to the main body 31 by using a fixture 35 such as a screw. Specifically, the fixture 35 is inserted into a through hole formed in the fixing plate 33 and fixed to the main body 31 by being, for example, screwed into the main body 31 to sandwich and fix the fixing plate 33 between the fixture 35 and the main body 31. In this embodiment, the fixing plate 33 is fixed by using a plurality (for example, three) of fixtures 35.

One of the plurality of fixtures 35 constitutes a protrusion 351 protruding more than the remaining fixtures 35. When the window member 30 is attached to the opening 151 of the partition wall 15, the protrusion 351 is inserted into and engaged with the positioning hole 152, thereby fixing the window member 30 to the opening 151. As described above, in this embodiment, the protrusion 351 is formed by using the fixture 35 for fixing the light transmitting plate 32 to the main body 31. However, the present invention is not limited to such a configuration, and may be provided with the protrusion 351 independently of the fixture 35.

The light transmitting plate 32 is made of, for example, potassium bromide (KBr). Potassium bromide has advantages of being inexpensive and high in infrared light transmittance and has the property of having high deliquescence and hence easily deliquescing depending on the humidity of the surrounding environment. Although the material of the light transmitting plate 32 is not limited to potassium bromide, the present invention is particularly effective when the light transmitting plate 32 is formed of a material with high deliquescence.

Engaging groove portions 36 that engage with the engaging protruding portions 47 of the lid member 40 are formed on the outer circumferential surface of the main body 31. The number of engaging groove portions 36 is the same as the number of the engaging protruding portions 47, and may be single or plural. Each of the engaging groove portions 36 extends in the circumferential direction along the outer circumferential surface of the main body 31. For example, the engaging groove portions 36 are formed at equal intervals in the circumferential direction.

Each of the engaging groove portions 36 has a shape obtained by joining a first groove portion 361 and a second groove portion 362. The length of the first groove portion 361 in the circumferential direction is longer than that of the engaging protruding portion 47. The first groove portion 361 is opened toward the end face 311 on the opposite side to the light transmitting plate 32 side of the main body 31. With this configuration, the window member 30 can be inserted into the window member accommodating space 46 of the lid member 40 from the end face 311 side, and the engaging protruding portions 47 of the lid member 40 can be inserted into the respective engaging groove portions 36 of the window member 30 from the first groove portions 361.

The second groove portion 362 communicates with the first groove portion 361 in the circumferential direction. Unlike the first groove portion 361, the second groove portion 362 is not opened toward the end face 311 side of the main body 31. Accordingly, after the engaging protruding portion 47 of the lid member 40 is received in the first groove portion 361, the window member 30 is relatively rotated to move the engaging protruding portion 47 into the second groove portion 362, thereby engaging the engaging protruding portion 47 with the engaging groove portion 36 (the second groove portion 362).

Further, on a portion of the outer circumferential surface of the main body 31, a magnet mounting portion 37 for mounting a magnet 38 is formed. The magnet mounting portion 37 is constituted by, for example, a concave portion formed in the outer circumferential surface of the main body 31, and the magnet 38 is inserted and mounted in the magnet mounting portion 37 (see FIG. 8C).

A magnetic force detector (not shown) for detecting the magnetic force of the magnet 38 is provided near the opening 151 in the housing 10. The magnetic force detector detects the magnetic force of the magnet 38 while the window member 30 is normally attached to the opening 151. When the magnetic force is detected, the lock function provided for the laser light source as the reference light source is released. This makes it possible to emit laser light from the laser light source upon confirming that the window member 30 is normally attached to the opening 151, thereby preventing the human body from being exposed to the laser light through the opening 151.

A seal member 39 constituted by, for example, an O-ring is attached to the outer circumferential surface of the main body 31. The seal member 39 has substantially the same outer diameter as that of the seal member 49 provided on the lid member 40. Accordingly, while the window member 30 is normally attached to the opening 151, the seal member 39 provided on the outer circumferential surface of the window member 30 comes into tight contact with the peripheral edge portion of the opening 151, thereby setting the inside of the housing 10 (the interferometer chamber 13) in an airtight state.

4. Attachment and Detachment of Lid Member and Window Member

Figure 9:
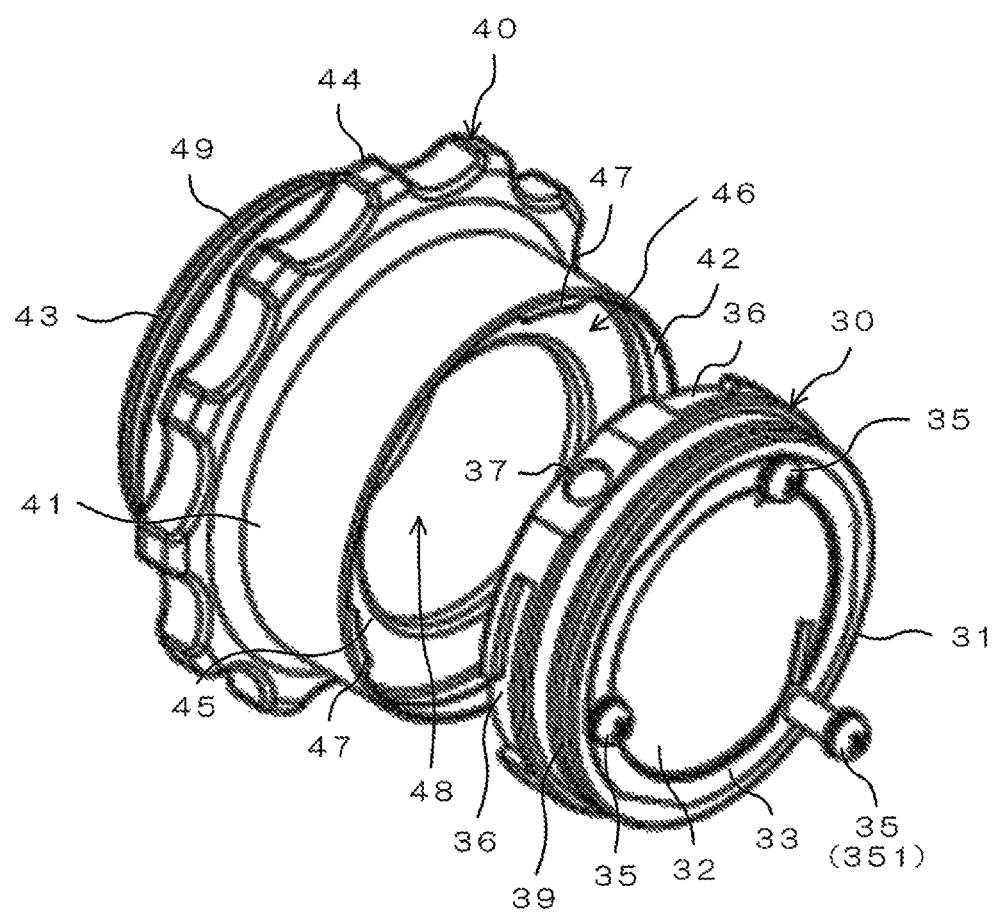
FIG. 9 is a perspective view showing a state in which the lid member and the window member are detached.
Figure 10A:
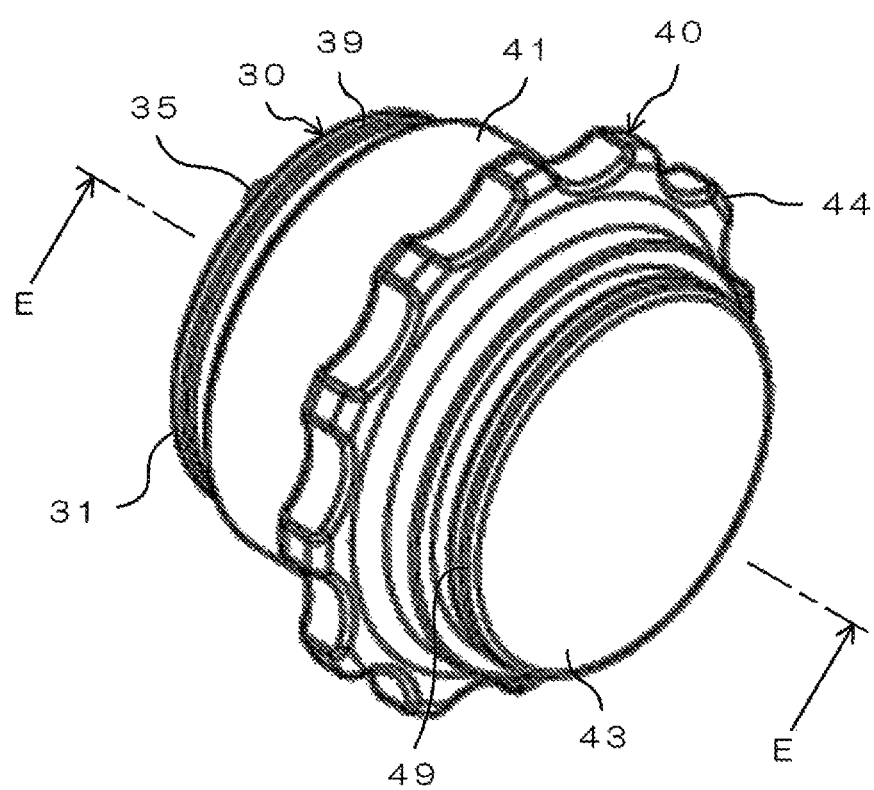
FIG. 10A is a perspective view showing a state in which the lid member and the window member are attached.
Figure 10B:
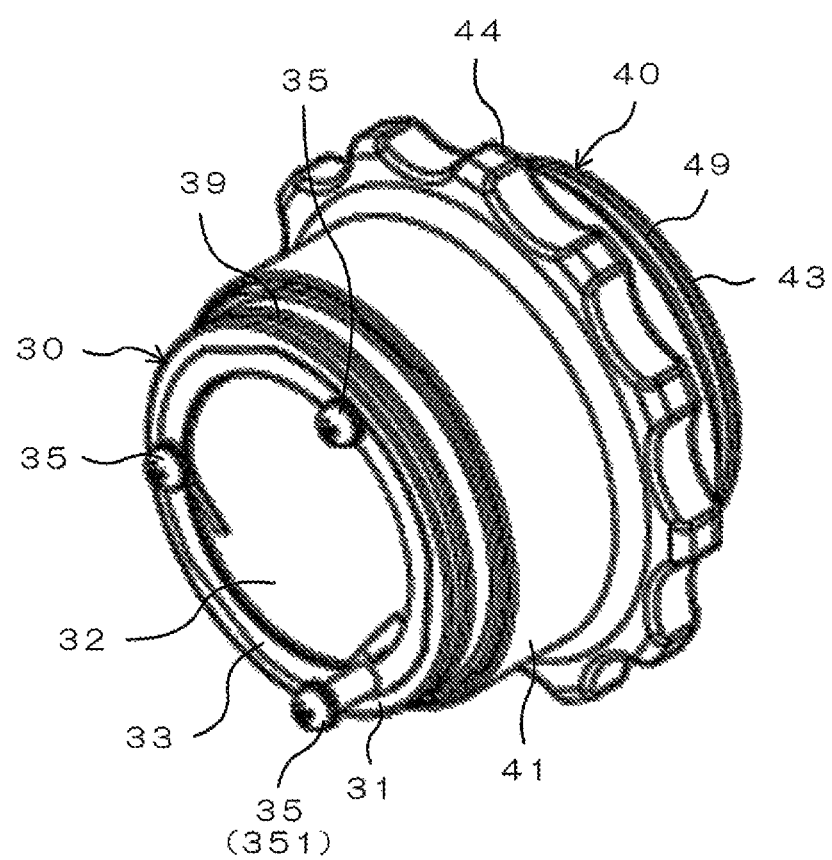
FIG. 10B is a perspective view showing a state in which the lid member and the window member are attached, when viewed from a direction different from that in FIG. 10A.
Figure 10C:
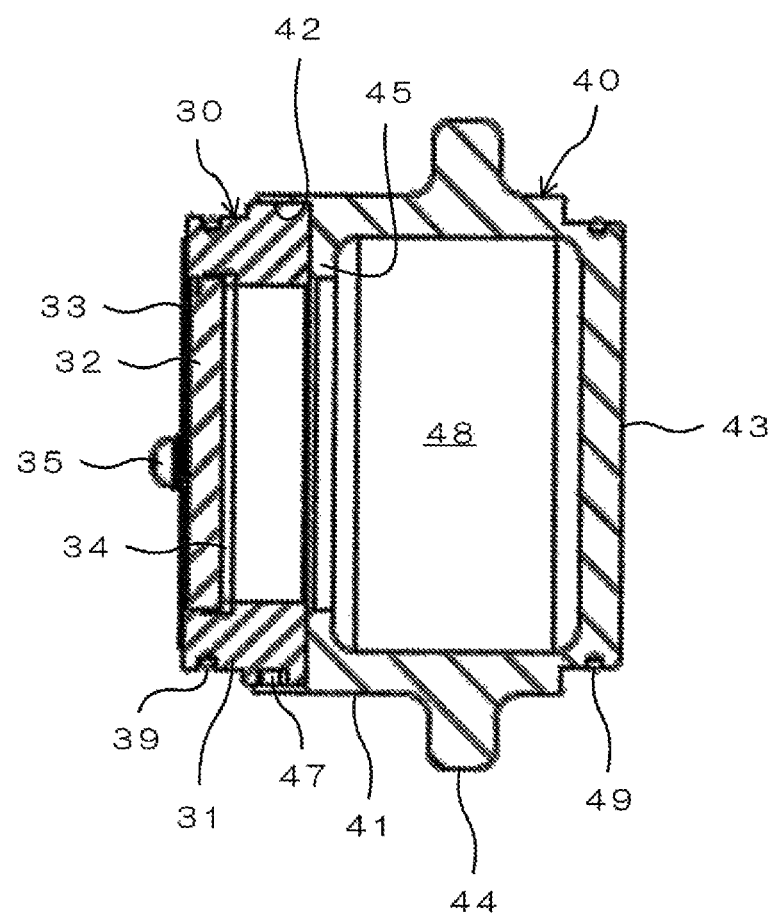
FIG. 10C is a sectional view taken along line E-E of the lid member and the window member in FIG. 10A.

FIG. 9 is a perspective view showing a state in which the lid member 40 and the window member 30 are detached. FIG. 10A is a perspective view showing a state in which the lid member 40 and the window member 30 are attached. FIG. 10B is a perspective view showing a state in which the lid member 40 and the window member 30 are attached, when viewed from a direction different from that in FIG. 10A. FIG. 10C is a sectional view taken along line E-E of the lid member 40 and the window member 30 in FIG. 10A.

When the window member 30 is attached to the lid member 40, the window member 30 and the lid member 40 are coaxially disposed such that the engaging protruding portions 47 of the lid member 40 face the engaging groove portions 36 of the window member 30, as shown in FIG. 9. In this state, by inserting the window member 30 into the window member accommodating space 46 of the lid member 40, the respective engaging protruding portions 47 are received in the first groove portions 361 of the respective engaging groove portions 36.

Thereafter, the window member 30 is rotated in the counterclockwise direction in FIG. 9. With this operation, the engaging protruding portions 47 positioned in the first groove portions 361 of the engaging groove portions 36 move into the second groove portions 362, and the engaging protruding portions 47 engage with the engaging groove portions 36 (the second groove portions 362), as shown in FIGS. 10A to 10C. After holding the window member 30 with the lid member 40 in this manner, the user grips the grip portion 44 of the lid member 40, inserts the window member 30 into the opening 151 of the partition wall 15, and fixes the window member 30 in the opening 151.

As shown in FIG. 10B, while the window member 30 is attached to the lid member 40, the protrusion 351 of the window member 30 protrudes to the opposite side to the lid member 40 side. When the window member 30 is fixed to the opening 151 by using the lid member 40, the protrusion 351 is inserted first into the first hole 153 (see FIG. 6) of the positioning hole 152 formed in the peripheral edge portion of the opening 151, and the lid member 40 is then rotated in the clockwise direction in FIG. 10A, thereby moving the protrusion 351 from the first hole 153 to the second hole 154 and engaging the protrusion 351 with the second hole 154.

5. Attachment and Detachment of Window Member to and from Opening

Figure 11A:
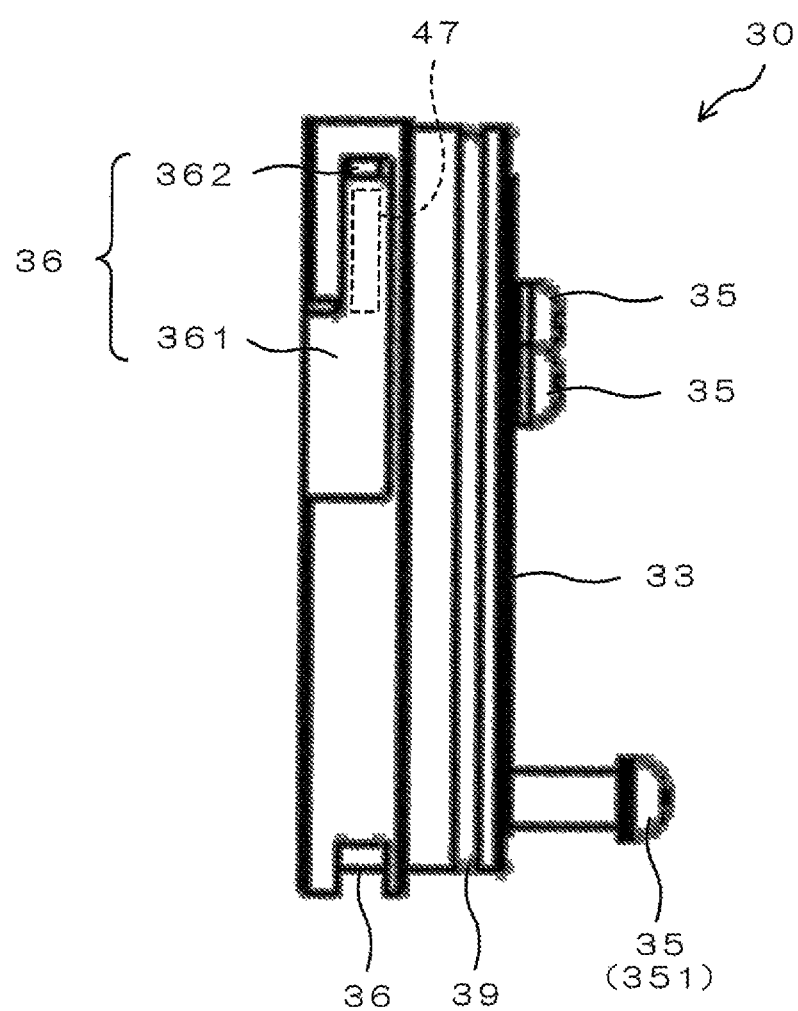
FIG. 11A is a view showing the positional relationship between an engaging protrusion portion and an engaging groove portion when the window member is attached to and detached from the opening.
Figure 11B:
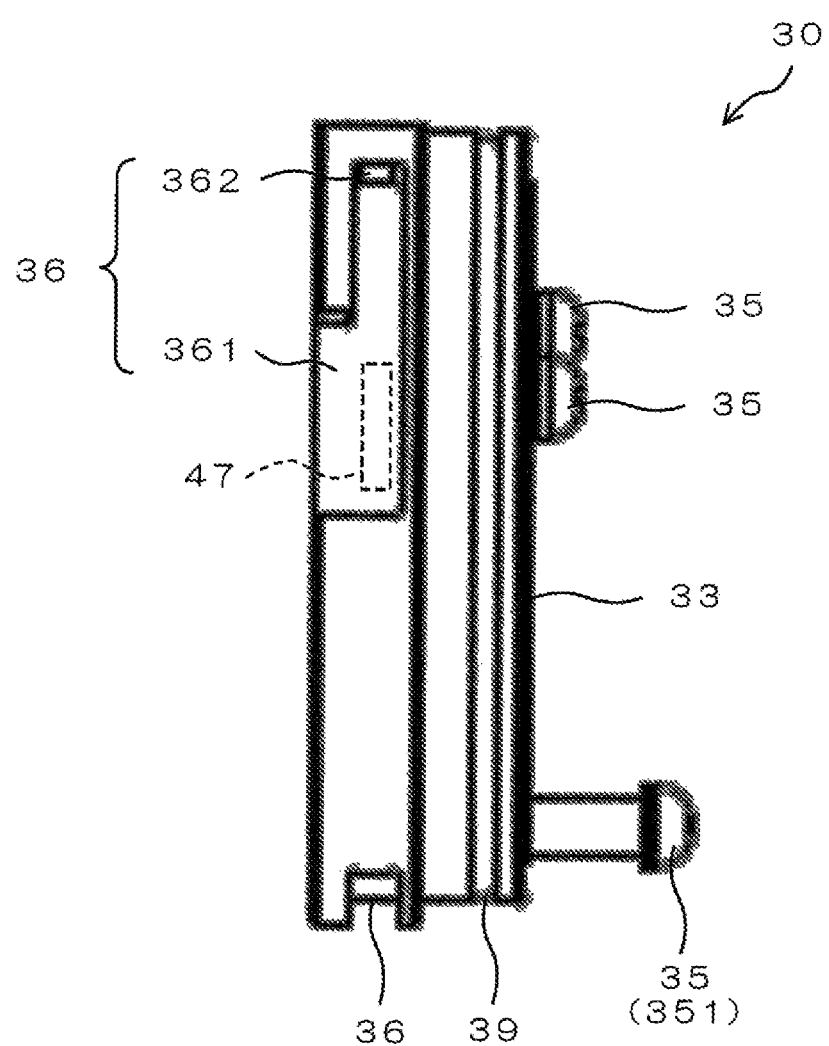
FIG. 11B is a view showing the positional relationship between the engaging protrusion portion and the engaging groove portion when the window member is attached to and detached from the opening.
Figure 12A:
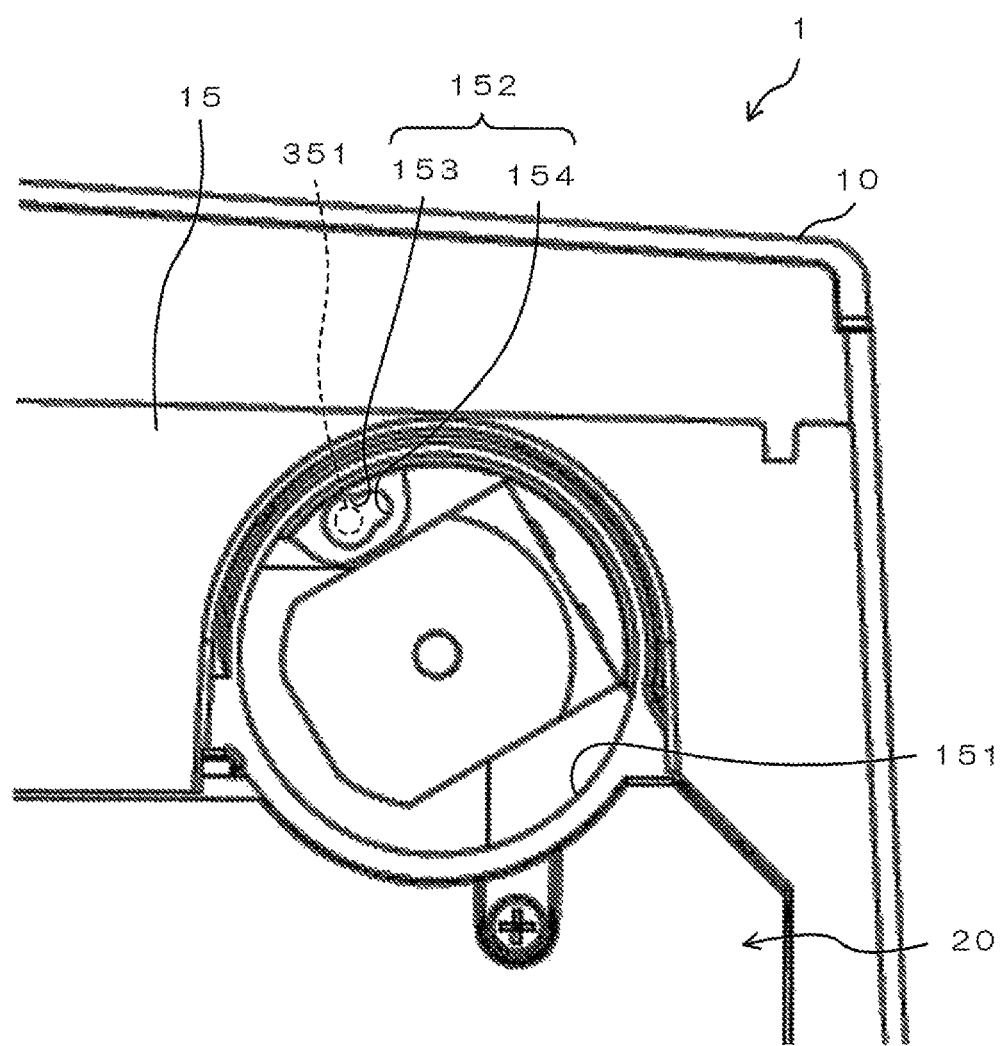
FIG. 12A is a view showing the positional relationship between a protrusion and a positioning hole when the window member is attached to and detached from the opening.
Figure 12B:
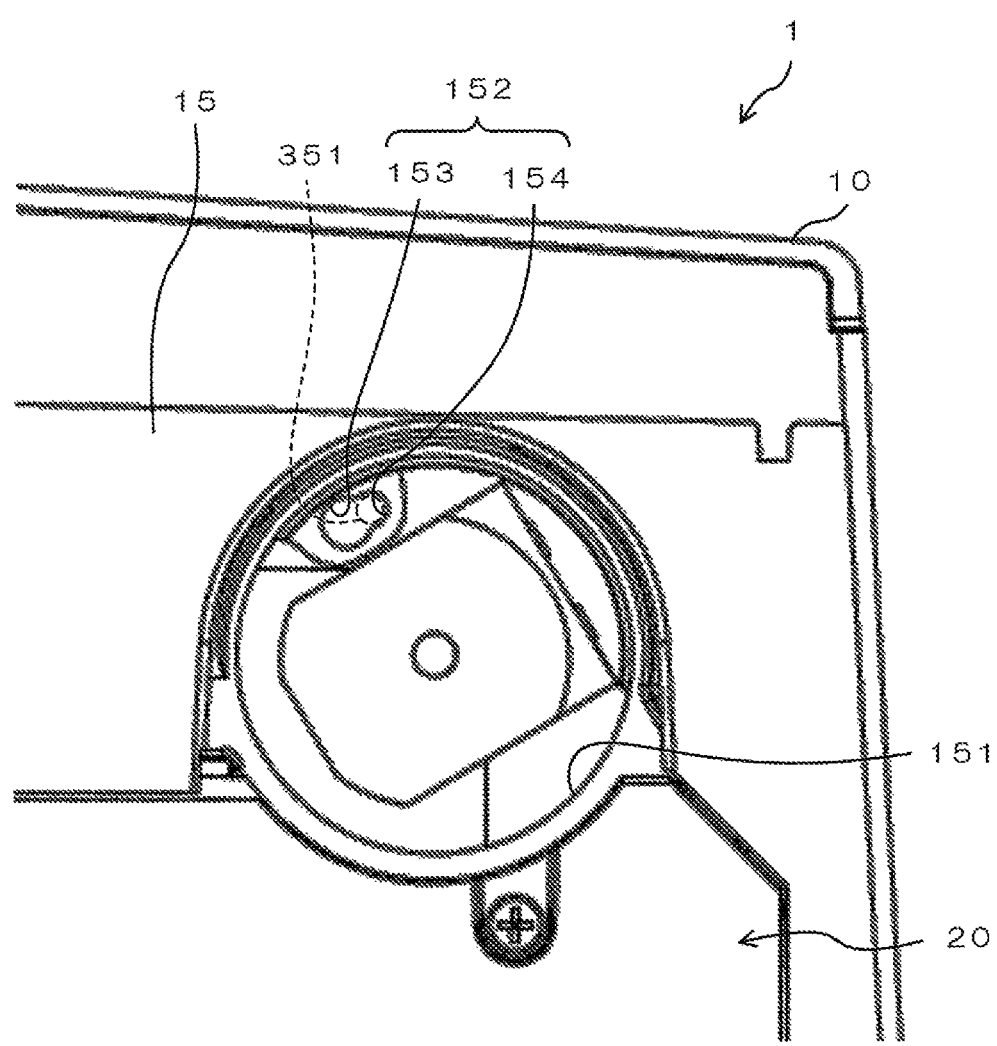
FIG. 12B is a view showing the positional relationship between the protrusion and the positioning hole when the window member is attached to and detached from the opening.

FIGS. 11A and 11B are views each showing the positional relationship between the engaging protruding portion 47 and the engaging groove portions 36 when the window member 30 is attached to and detached from the opening 151. FIGS. 12A and 12B are views each showing the positional relationship between the protrusion 351 and the positioning hole 152 when the window member 30 is attached to and detached from the opening 151.

In a state in which the window member 30 is attached to the lid member 40, the engaging protruding portion 47 engages with the second groove portion 362 of the engaging groove portion 36, as shown in FIG. 11A. When the window member 30 is inserted into the opening 151 in this state, the protrusion 351 of the window member 30 is positioned in the first hole 153 of the positioning hole 152, as shown in FIG. 12A.

Thereafter, when the lid member 40 is rotated in the clockwise direction (one direction) in FIG. 12A, a force is also applied to the window member 30 attached to the lid member 40 in the same direction. At this time, the resistance generated when the protrusion 351 moves from the first hole 153 of the positioning hole 152 to the second hole 154 is larger than the resistance generated when the engaging protruding portion 47 moves from the second groove portion 362 of the engaging groove portion 36 to the first groove portion 361. Therefore, while the protrusion 351 is maintained in the first hole 153 of the positioning hole 152, the engaging protruding portion 47 moves to the first groove portion 361 of the engaging groove portion 36.

At this time, the rotational position of the window member 30 (the rotational angle relative to the opening 151) is the first rotational position. That is, at the first rotational position, the engaging protruding portion 47 is positioned in the first groove portion 361 of the engaging groove portion 36 (see FIG. 11B), and the protrusion 351 is positioned in the first hole 153 of the positioning hole 152 (see FIG. 12A). In this state, the engagement state of the lid member 40 with respect to the window member 30 is released, but the window member 30 is not yet fixed to the opening 151.

Subsequently, when the lid member 40 is further rotated in the clockwise direction (one direction) in FIG. 12A, while the engaging protruding portion 47 is positioned in the first groove portion 361 of the engaging groove portion 36, the protrusion 351 moves to the second hole 154 of the positioning hole 152. The rotational position of the window member 30 at this time is the second rotational position. That is, at the second rotational position, the engaging protruding portion 47 is positioned in the first groove portion 361 of the engaging groove portion 36 (see FIG. 11B), and the protrusion 351 is positioned in the second hole 154 of the positioning hole 152 (see FIG. 12B). In this state, the protrusion 351 fits into the second hole 154 of the positioning hole 152 to fix the window member 30 to the opening 151.

At the second rotational position (see FIGS. 11B and 12B), since the engaging protruding portion 47 has already moved to the first groove portion 361 of the engaging groove portion 36, the lid member 40 can be easily detached from the window member 30 by separating the lid member 40 from the window member 30 fixed to the opening 151. As a result, as shown in FIG. 5, only the window member 30 is attached to the opening 151, and infrared light can be applied into the sample chamber 20 via the window member 30.

When the infrared spectrophotometer 1 is not used, it is preferable to store the window member 30 in a low-humidity environment in order to prevent the light transmitting plate 32 of the window member 30 from deteriorating due to deliquescence or the like. In this case, the window member 30 can be detached from the opening 151 and moved to a low-humidity environment. However, in this embodiment, while the window member 30 is fixed to the opening 151, the window member 30 can be stored by using the lid member 40.

Specifically, first of all, the lid member 40 is brought close to the window member 30 fixed to the opening 151 in the state shown in FIG. 12B, and the engaging protruding portion 47 of the lid member 40 is inserted into the first groove portion 361 of the engaging groove portion 36 of the window member 30. At this time, the window member 30 is at the second rotational position (see FIGS. 11B and 12B). When the lid member 40 is rotated in the counterclockwise direction in FIG. 12B (direction opposite to the one direction) from this state, the engaging protruding portion 47 moves from the first groove portion 361 of the engaging groove portion 36 to the second groove portion 362 (see FIG. 11A). At this time, since the protrusion 351 of the window member 30 is kept fitted in the second hole 154 of the positioning hole 152, the window member 30 is kept fixed in the opening 151.

When the lid member 40 is rotated in the counterclockwise direction in FIG. 12B from the second rotational position while the window member 30 is fixed to the opening 151, the engaging protruding portion 47 of the lid member 40 engages with the engaging groove portion 36 (the second groove portion 362) of the window member 30. As a result, the moisture absorbent accommodating space 48 formed in the main body 41 of the lid member 40 is closed by the window member 30 to be set in a substantially airtight state. In this case, the substantially airtight state may be a state in which the moisture absorbent stored in the moisture absorbent accommodating space 48 maintains the inside of the moisture absorbent accommodating space 48 in a low-humidity environment to the extent that the window member does not deteriorate. This state is not limited to a completely enclosed state but includes a state in which outside air can enter and exit the moisture absorbent accommodating space 48 to some extent.

In this state, as shown in FIGS. 1 and 2, the lid member 40 engages with the window member 30 attached to the opening 151 from a side of the sample chamber 20, so that the side of the sample chamber 20 of the window member 30 is covered with the lid member 40, and the moisture absorbent accommodating space 48 is set in a substantially airtight state. Accordingly, if the moisture absorbent is stored in the moisture absorbent accommodating space 48, the window member 30 can be stored in a low-humidity environment.

When the window member 30 is stored by the method as described above, the moisture absorbent is stored in advance in the moisture absorbent accommodating space 48 in the lid member 40 (moisture absorbent accommodating step), and the lid member 40 engages with the window member 30 attached to the opening 151 from the side of the sample chamber 20, thus covering the side of the sample chamber 20 of the window member 30 with the lid member 40 (lid member engaging step). However, after the lid member 40 engages with the window member 30, the moisture absorbent may be stored in the moisture absorbent accommodating space 48.

When the lid member 40 is further rotated in the counterclockwise direction from the state shown in FIGS. 1 and 2, the window member 30 can be detached from the opening 151. Specifically, when the lid member 40 is further rotated in the counterclockwise direction in FIG. 12B, while the engaging protruding portion 47 is positioned in the second groove portion 362 of the engaging groove portion 36, the protrusion 351 moves to the second hole 154 of the positioning hole 152 to the first hole 153 (see FIGS. 11A and 12A). In this state, since the engagement state of the window member 30 with respect to the opening 151 is released while the lid member 40 engages with the window member 30, the window member 30 can be detached from the opening 151, together with the lid member 40, by separating the lid member 40 from the opening 151. As a result, as shown in FIG. 4, the opening 151 is opened so that the window member 30 can be replaced with another window member 30.

6. Function and Effect (1) In this embodiment, engaging the lid member 40 with the window member 30 attached to the opening 151 from the side of the sample chamber 20 can cover the side of the sample chamber 20 of the window member 30 with the lid member 40 (see FIGS. 1 and 2). In this state, since the moisture absorbent accommodating space 48 formed inside the lid member 40 is substantially airtight, accommodating a moisture absorbent in the moisture absorbent accommodating space 48 can prevent the window member 30 from deteriorating due to the humidity of the surrounding environment. Therefore, the window member 30 can be easily stored in a low-humidity environment without being detached.

(2) According to this embodiment, the window member 30 can be fixed to the opening 151 by using the lid member 40. That is, while the window member 30 can be covered with the lid member 40 when being stored (see FIGS. 1 and 2), the window member 30 can be attached and detached by using the lid member 40 (see FIGS. 4 and 5). Accordingly, it is easy to store the window member 30, and attach and detach the window member 30. Further, there is no need to separately prepare a dedicated tool for attaching and detaching the window member 30.

(3) In particular, the window member 30 can be fixed to the opening 151 (see FIG. 12B) and the lid member 40 can be detached from the window member 30 (see FIG. 11B) only by inserting the window member 30 into the opening 151 and rotating the lid member 40 in one direction (the clockwise direction in FIG. 12A) while the window member 30 is attached to the lid member 40. This further facilitates attaching and detaching the window member 30.

(4) In addition, only by rotating the lid member 40 in a direction opposite to the one direction (the counterclockwise direction in FIG. 12B) while the window member 30 is fixed to the opening 151, the moisture absorbent accommodating space 48 formed inside the lid member 40 can easily be set in a substantially airtight state (see FIG. 11A). This further facilitates storing the window member 30.

(5) Further, the window member 30 can be easily detached from the opening 151 (see FIG. 12A) only by rotating the lid member 40 in a direction (the counterclockwise direction in FIG. 12B) opposite to the one direction from a state in which the window member 30 is covered with the lid member 40 and stored (see FIGS. 1 and 2). This further facilitates attaching and detaching the window member 30.

(6) According to this embodiment, the protrusion 351 formed on the window member 30 can be engaged with the positioning hole 152 and the window member 30 can be easily fixed to the opening 151 only by inserting the protrusion 351 into the positioning hole 152 of the partition wall 15 and rotating the lid member 40. As described above, when the protrusion 351 is configured to engage with the positioning hole 152, the window member 30 can always be fixed at the same position without excessively rotating the lid member 40 unlike the case of using the screw mechanism, thereby preventing the window member 30 from being damaged. Further, since the window member 30 can always be fixed at the same position, the positional accuracy between the magnet 38 provided for the window member 30 and the magnetic force detector for detecting the magnetic force of the magnet 38 can also be improved.

(7) According to this embodiment, when the window member 30 is not attached to the opening 151, for example, during transportation or storage, the lid member 40 is turned to the other side and the closing portion 43 is inserted into the opening 151 (see FIG. 3), thereby closing the opening 151. This can make the interferometer chamber 13 in the housing 10 into an enclosed space, and hence can prevent deterioration of the disposed optical components due to humidity.

7. Modification

The above embodiment has exemplified the storage method for the window member 30 provided between the interferometer chamber 13 and the sample chamber 20. However, in some cases, the window member 30 is provided between the interferometer chamber 14 and the sample chamber 20, and the present invention is also applicable to the case of storing such a window member 30.

In the above embodiment, the Fourier transform infrared spectrophotometer has been described as an example of the infrared spectrophotometer 1, but the present invention can also be applicable to other types of infrared spectrophotometers such as an ultraviolet-visible infrared spectrophotometer or a dispersive infrared spectrophotometer.

The above embodiment has exemplified the case in which the present invention adopts the configuration in which the window member 30 can be stored by being covered with the lid member 40 (see FIGS. 1 and 2), and the configuration in which the window member 30 can be attached and detached by using the lid member 40 (see FIGS. 4 and 5). However, the present invention is not limited to this, and only one of the configurations may be adopted.

What is claimed is:

1. An infrared spectrophotometer that irradiates a sample in a sample chamber with infrared light and detects light from the sample with a detector, the infrared spectrophotometer comprising:
 a housing having a partition wall constituting a wall surface of the sample chamber, with an interferometer chamber in which an optical component is disposed being formed on an opposite side to the sample chamber with respect to the partition wall;
 a window member that is attachable to and detachable from an opening formed in the partition wall and transmits light between the sample chamber and the interferometer chamber; and
 a lid member attachable to and detachable from the window member and having a space formed internally,
 wherein the lid member engages with the window member attached to the opening from a side of the sample chamber so that the side of the sample chamber of the window member is covered with the lid member to set the space in a substantially airtight state.

2. The infrared spectrophotometer according to claim 1, wherein the space is a moisture absorbent accommodating space for storing a moisture absorbent.

3. The infrared spectrophotometer according to claim 1, wherein while the window member is attached to the lid member, the window member is fixed to the opening by using the lid member, and the lid member is detached from the window member after the window member is fixed.

4. The infrared spectrophotometer according to claim 3, wherein an engagement state of the lid member with respect to the window member is released by inserting the window member attached to the lid member into the opening and rotating the lid member in one direction to a first rotational position, and the window member is fixed to the opening by further rotating the lid member from the first rotational position in the one direction to a second rotational position.

5. The infrared spectrophotometer according to claim 4, wherein the lid member engages with the window member to set the space in a substantially airtight state by rotating the lid member from the second rotational position in a direction opposite to the one direction while the window member is fixed to the opening.

6. The infrared spectrophotometer according to claim 5, wherein the window member is detached from the opening by further rotating the lid member in the direction opposite to the one direction from a state in which the lid member engages with the window member.

7. The infrared spectrophotometer according to claim 4, wherein a protrusion protruding toward an opposite side to the lid member while the window member is attached to the lid member is formed on the window member, a positioning hole for positioning the window member by allowing the protrusion to be inserted is formed in the partition wall, and the protrusion engages with the positioning hole to fix the window member to the opening by inserting the window member attached to the lid member into the opening and rotating the lid member to the second rotational position.

8. The infrared spectrophotometer according to claim 1, wherein the lid member has a closing portion on an opposite side to a side to which the window member is attached, and the opening is closed by inserting the closing portion into the opening.

9. A method of storing a window member in an infrared spectrophotometer including a housing having a partition wall constituting a wall surface of a sample chamber, with an interferometer chamber in which an optical component is disposed being formed on an opposite side to the sample chamber with respect to the partition wall and the window member that is attachable to and detachable from an opening formed in the partition wall and transmits light between the sample chamber and the interferometer chamber, the method comprising:

an moisture absorbent accommodating step of accommodating an moisture absorbent in a space formed in a lid member attachable to and detachable from the window member; and a lid member engaging step of covering a side of the sample chamber of the window member with the lid member by engaging the lid member with the window member attached to the opening from the side of the sample chamber.

* * * * *

UNITED STATES PATENT AND TRADEMARK OFFICE
CERTIFICATE OF CORRECTION

| | |
|---|---|
| PATENT NO. | : 10,620,047 B2 |
| APPLICATION NO. | : 16/182709 |
| DATED | : April 14, 2020 |
| INVENTOR(S) | : Tadafumi Kamikake |

It is certified that error appears in the above-identified patent and that said Letters Patent is hereby corrected as shown below:

On the Title Page

Column 1, item (72), the Inventor:
Delete "Tadafusa Kamikake, Kyoto (JP)"
Insert --Tadafumi Kamikake, Kyoto (JP)--

Signed and Sealed this
Twelfth Day of November, 2024

Katherine Kelly Vidal
*Director of the United States Patent and Trademark Office*